(12) United States Patent
Schwarz et al.

(10) Patent No.: US 11,202,086 B2
(45) Date of Patent: Dec. 14, 2021

(54) APPARATUS, A METHOD AND A COMPUTER PROGRAM FOR VOLUMETRIC VIDEO

(71) Applicant: Nokia Technologies Oy, Espoo (FI)

(72) Inventors: Sebastian Schwarz, Unterhaching (DE); Vida Fakour Sevom, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/976,451

(22) PCT Filed: Feb. 19, 2019

(86) PCT No.: PCT/FI2019/050129
§ 371 (c)(1),
(2) Date: Aug. 27, 2020

(87) PCT Pub. No.: WO2019/166688
PCT Pub. Date: Sep. 6, 2019

(65) Prior Publication Data
US 2021/0006806 A1 Jan. 7, 2021

(30) Foreign Application Priority Data
Mar. 1, 2018 (FI) .................................... 20185195

(51) Int. Cl.
*H04N 19/20* (2014.01)
*H04N 19/186* (2014.01)
(Continued)

(52) U.S. Cl.
CPC .......... *H04N 19/20* (2014.11); *H04N 19/186* (2014.11); *H04N 19/597* (2014.11); *H04N 19/82* (2014.11)

(58) Field of Classification Search
CPC ............................. H04N 19/20; H04N 19/186
(Continued)

(56) References Cited

U.S. PATENT DOCUMENTS

2004/0222987 A1 11/2004 Chang et al.
2014/0152647 A1* 6/2014 Tao .................... G06T 7/557
345/419

(Continued)

FOREIGN PATENT DOCUMENTS

WO 2019/034807 A1 2/2019
WO 2019/073117 A1 4/2019

OTHER PUBLICATIONS

Ruhnke et al, Hierarchical Space Coded Surface Models (Year: 2018).*

(Continued)

*Primary Examiner* — Amir Shahnami
(74) *Attorney, Agent, or Firm* — Harrington & Smith

(57) ABSTRACT

Video encoding may comprise obtaining a volumetric content containing visual information of three-dimensional objects; generating at least one patch by projecting the visual information of three-dimensional objects of the volumetric content to at least one projection plane. Video decoding may comprise obtaining neighboring pixels of a location on the 2D image based on said geometry information; determining a difference of values of the neighboring pixels on the 2D image; comparing the difference with a value range to determine a number of 3D points to be interpolated; projecting back the 2D image to create the volumetric content; wherein the projection comprises interpolating the number of 3D points on the basis of the values of the neighboring pixels.

14 Claims, 13 Drawing Sheets

(51) Int. Cl.
*H04N 19/597* (2014.01)
*H04N 19/82* (2014.01)

(58) Field of Classification Search
USPC .................................................. 375/240.26
See application file for complete search history.

(56) References Cited

U.S. PATENT DOCUMENTS

2016/0328829 A1* 11/2016 Kiyota .................... E02F 9/261
2017/0116781 A1   4/2017 Babahajiani et al.

OTHER PUBLICATIONS

Guede et al "Coding of Moving Pictures and Audio" (Year: 2014).*
Mammou, "PCC Test Model Category 2 v0", ISO/IEC JTC1/SC29/WG11 N17248, 3DG, Oct. 2017, 11 pages.
Guede et al., "Geometry image coding improvements", ISO/IEC JTC1/SC29/WG11 M42111, Technicolor, Jan. 2018, 12 pages.
"Information technology—Coded Representation of Immersive Media—Part 5: Video-based Point Cloud Compression", ISO/IEC 23090-5, 2018 (E), May 8, 2019, 140 pages.
Office action received for corresponding Finnish Patent Application No. 20185195, dated Nov. 16, 2018, 10 pages.
Ruhnke et al., "Hierarchical Sparse Coded Surface Models", IEEE International Conference on Robotics and Automation (ICRA), May 31-Jun. 7, 2014, pp. 6238-6243.
Duan et al., "Compression of the Layered Depth Image", IEEE Transactions on Image Processing, vol. 12, No. 3, Mar. 2003, pp. 365-372.
Golla et al., "Real-Time Point Cloud Compression", IEEE/RSJ International Conference on Intelligent Robots and Systems (IROS), September 28-Oct. 2, 2015, pp. 5087-5092.
International Search Report and Written Opinion received for corresponding Patent Cooperation Treaty Application No. PCT/FI2019/050129, dated May 24, 2019, 16 pages.
Schwarz, Sebastian et al., "Removal of second layer coding for PCC TMC2vl", Nokia Technologies, ISO/IEC JTC1/SC29/WG11 MPEG2016/M42438, Feb. 2016, 7 pages.

* cited by examiner

APPARATUS, A METHOD AND A COMPUTER PROGRAM FOR VOLUMETRIC VIDEO

RELATED APPLICATION

This application claims priority to PCT Application No. PCT/FI2019/050129, filed on Feb. 19, 2019, which claims priority to Finland Application No. 20185195, filed on Mar. 1, 2018, each of which is incorporated herein by reference in its entirety.

TECHNICAL FIELD

The present invention relates to an apparatus, a method and a computer program for content dependent projection for volumetric video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances, comparable to frames in two-dimensional (2D) video. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

Because volumetric video describes a 3D scene (or object), it may be possible to view such data from any viewpoint. Therefore, volumetric video may be a usable format for any AR, VR, or MR applications, especially for providing six degrees-of-freedom (6DOF) viewing capabilities.

In dense point clouds or voxel arrays, the reconstructed 3D scene may contain tens or even hundreds of millions of points. If such representations are to be stored or interchanged between entities, then efficient compression may be needed.

The above mentioned volumetric video representation formats suffer from poor spatial and temporal coding performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview+depth, have much better compression efficiency, but rarely cover the full scene. Therefore, they provide only limited 6DOF capabilities.

There is, therefore, a need for solutions for improved coding of volumetric video.

SUMMARY

Now there has been invented an improved method and technical equipment implementing the method, by which the above problems are alleviated. Various aspects of the invention include a method, an apparatus (an encoder and/or a decoder), a system and a computer readable medium comprising a computer program or a signal stored therein, which are characterized by what is stated in the independent claims. Various details of the invention are disclosed in the dependent claims and in the corresponding images and description.

A volumetric video, for example dynamic point clouds, arrays of voxels or mesh models or a combination of such, may be projected onto a number of projection surfaces having simple geometries, for example sphere(s), cylinder(s), cube(s), polyhedron(s) and/or plane(s). In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection plane). Such projection surfaces may be unfolded onto two-dimensional (2D) planes, e.g. resulting in a two-dimensional pixel image. Known 2D video coding solutions may be applied for each projection to code the pixel information resulting from the texture data. In connection with the texture information, relevant projection geometry information, comprising e.g. projection or projection surface type, location and orientation of the projection surface in 3D space, size of the projection surface, per-pixel occupancy information, and other related data, may be transmitted either in the same bitstream or separately along the bitstream. At the receiver side, the bitstream may be decoded and volumetric video may be reconstructed from decoded 2D projections and projection geometry information. At the decoder side the format need not necessarily be the same than the format used at the encoder side. FIG. 6 illustrates this process for a cylinder-projection of a volumetric video comprising a single person.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

In an encoding method, a bitstream may be encoded or encapsulated, the bitstream comprising one or more coded texture pictures and one or more coded depth pictures. Each texture picture may represent a 2D projection of 3D data onto a given geometry and each depth picture may represent depth data of pixels of the texture picture.

In a decoding method, a bitstream comprising one or more coded texture picture(s) and one or more coded depth pictures may be received and decoded. The texture picture represents a two-dimensional projection of three-dimensional data onto a projection surface with a given geometry and the depth pictures represents depth data of pixels of the texture picture. A geometry picture may represent geometry data, e.g. depth from the projection surface. Additional auxiliary pictures may represent further attributes, e.g. surface normal, reflectance, opacity, etc. as described earlier. Relevant projection information may also be decoded from or along a bitstream. From this decoded information, a 3D scene may be reconstructed accordingly.

Some embodiments provide a method for encoding and decoding volumetric video information. In some embodiments of the present invention there is provided a method, apparatus and computer program product for volumetric video coding as well as decoding.

Various aspects of examples of the invention are provided in the detailed description.

According to a first aspect, there is provided a method comprising:

obtaining a volumetric content containing visual information of three-dimensional objects;

generating at least one patch by projecting the visual information of three-dimensional objects of the volumetric content to at least one projection plane;

wherein if more than one 3D point is projected to the same location on the said at least one patch, the method comprises selecting a single value for that location; and storing the at least one patch of the projection plane to a 2D image.

An apparatus according to a second aspect comprises at least one processor and at least one memory, said at least one memory stored with code thereon, which when executed by said at least one processor, causes the apparatus to perform at least:

obtain a volumetric content containing visual information of three-dimensional objects;

generate at least one patch by projecting the visual information of three-dimensional objects of the volumetric content to at least one projection plane;

select a single value for that location, if more than one 3D point is projected to the same location on the said at least one patch; and store the at least one patch of the projection plane to a 2D image.

A computer readable storage medium according to a third aspect comprises code for use by an apparatus, which when executed by a processor, causes the apparatus to perform:

obtain a volumetric content containing visual information of three-dimensional objects;

generate at least one patch by projecting the visual information of three-dimensional objects of the volumetric content to at least one projection plane;

project each patch onto one image;

select a single value for that location, if more than one 3D point is projected to the same location on the said at least one patch; and store the at least one patch of the projection plane to a 2D image.

An apparatus according to a fourth aspect comprises:

means for obtaining a volumetric content containing visual information of three-dimensional objects;

means for generating at least one patch by projecting the visual information of three-dimensional objects of the volumetric content to at least one projection plane;

means for selecting a single value for that location, if more than one 3D point is projected to the same location on the said at least one patch; and means for storing the at least one patch of the projection plane to a 2D image.

Further aspects include at least apparatuses and computer program products/code stored on a non-transitory memory medium arranged to carry out the above methods.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
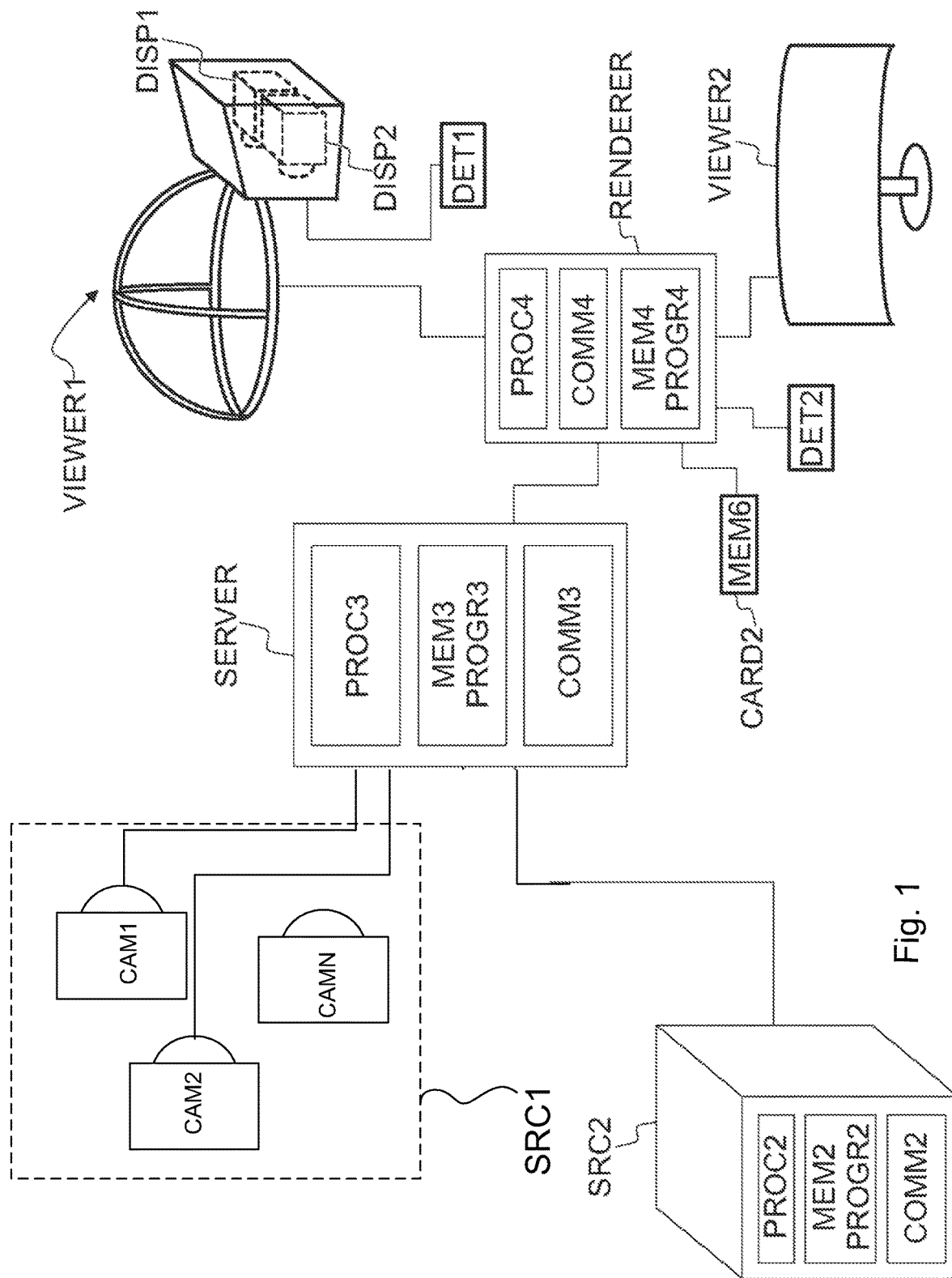
FIG. 1 shows a system for capturing, encoding, decoding, reconstructing and viewing a three-dimensional scheme.

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene data is required.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as set of texture and depth map as is the case in the multi-view plus depth. Closely related to the techniques used in multi-view plus depth is the use of elevation maps, and multi-level surface maps.

Instead of the above-mentioned approach, a 3D scene, represented as meshes, points, and/or voxel, can be projected onto one, or more, geometries. These geometries are "unfolded" onto 2D planes (two planes per geometry: one for texture, one for depth), which are then encoded using standard 2D video compression technologies. Relevant projection geometry information is transmitted alongside the encoded video files to the decoder. The decoder decodes the video and performs the inverse projection to regenerate the 3D scene in any desired representation format (not necessarily the starting format).

Projecting volumetric models onto 2D planes allows for using readily available 2D video coding tools with highly efficient temporal compression. Thus, coding efficiency is increased greatly. Using geometry-projections instead of 2D-video based approaches, i.e. multiview+depth, may provide a better coverage of the scene (or object). Thus, 6DOF capabilities may be improved. Using several geometries for individual objects may improve the coverage of the scene further. Furthermore, standard video encoding hardware can be utilized for real-time compression/decompression of the projected planes. The projection and reverse projection steps may be of low complexity.

In the projection-based volumetric video coding approach, a volumetric video is represented by at least one texture image and at least one depth image plane. The spatial resolution of each plane defines the number of available points for reconstruction, thus the detail level and quality of the reconstructed volumetric video at the receiver's side. Though, the spatial resolution of each plane also directly affects the required bit rate to encode and transmit the volumetric video. Obviously, lower spatial resolutions require less bit rate. As volumetric video objects typically describe coherent, piece-wise smooth surfaces, it is only logical to transmit lower resolution projection planes and upsample or interpolate the volumetric video content at the receiver's side, i.e. increase detail by closing surfaces or interpolating 3D points between known values.

Some 3D interpolation approaches can be utilised for this interpolation step. However, reconstruction quality can be drastically improved by amending the preceding downsampling step in the 3D->2D conversion to better represent the unique 3D->2D->3D processing chain applied in projection-based volumetric video.

Finally, reflecting such a dedicated downsampling approach during the reconstruction upsampling closes the loop and provides optimised coding efficiency for volumetric video compression.

When encoding a volumetric video, each frame may produce several hundred megabytes or several gigabytes of voxel data which needs to be converted to a format that can be streamed to the viewer and rendered in real-time. The amount of data depends on the world complexity and the number of capturing elements, e.g. cameras. The larger impact comes in a multi-device recording setup with a number of separate locations from where the cameras are recording. Such a setup produces more information than an individual camera at a single location.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera, in order that a viewer can determine the distance and location of objects within the scene. To create a pair of images with disparity, two camera sources are used.

The system of FIG. 1 may consist of three main parts: image sources, a server and a rendering device. A video source SRC1 may comprise multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high-resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively, or in addition to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to one or more computer processors (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real-world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device.

Any of the devices (SRC1, SRC2, SERVER, RENDERER, VIEWER1, VIEWER2) may be a computer, a portable computing device, or be connected to such or configured to be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
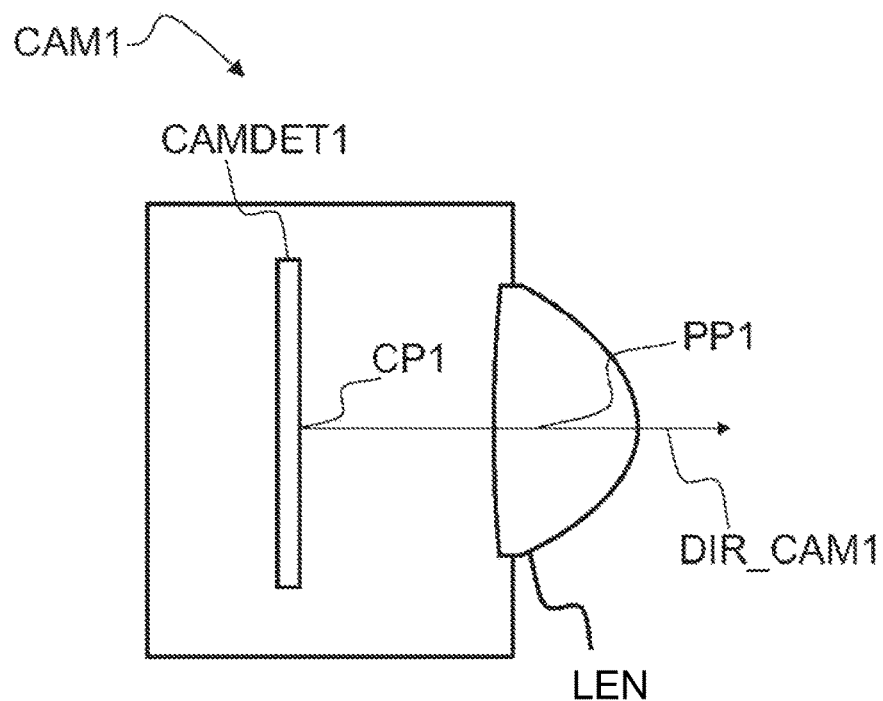
FIGS. 2a and 2b show a capture device and a viewing device.
Figure 2B:
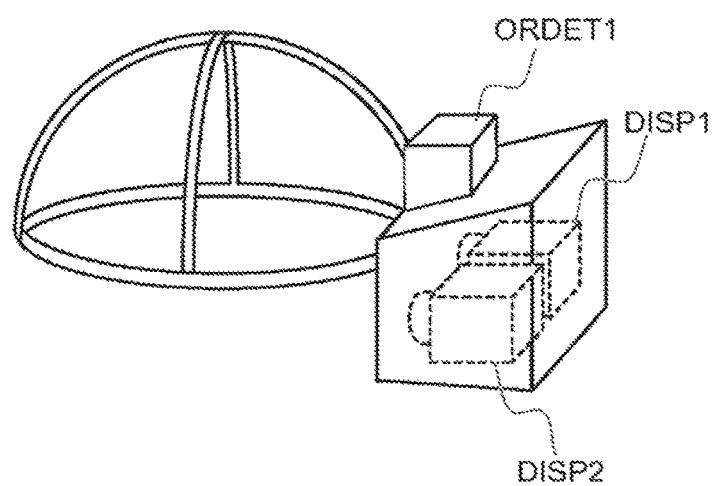

FIGS. 2a and 2b show a capture device and a viewing device, respectively. FIG. 2a illustrates a camera CAM1. The camera has a camera detector CAMDET1, comprising a plurality of sensor elements for sensing intensity of the light hitting the sensor element. The camera has a lens LEN (or a lens arrangement of a plurality of lenses), the lens being positioned so that the light hitting the sensor elements travels through the lens to the sensor elements. The camera detector CAMDET1 has a nominal centre point CP1 that is a middle point of the plurality of sensor elements, for example for a rectangular sensor the crossing point of diagonals of the rectangular sensor. The lens has a nominal centre point PP1, as well, lying for example on the axis of symmetry of the lens. The direction of orientation of the camera is defined by the line passing through the centre point CP1 of the camera sensor and the centre point PP1 of the lens. The direction of the camera is a vector along this line pointing in the direction from the camera sensor to the lens. The optical axis of the camera is understood to be this line CP1-PP1. However, the optical path from the lens to the camera detector need not always be a straight line but there may be mirrors and/or some other elements which may affect the optical path between the lens and the camera detector.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. When the device will be used by a user, the user may put the device on her/his head so that it will be attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video and orientation data is first recorded with the capture devices. This can consist of multiple concurrent video streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively, or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network and renders it into a viewing reproduction of the original location which can be experienced by a user. The reproduction may be two-dimensional or three-dimensional (stereo image pairs).

Figure 3A:
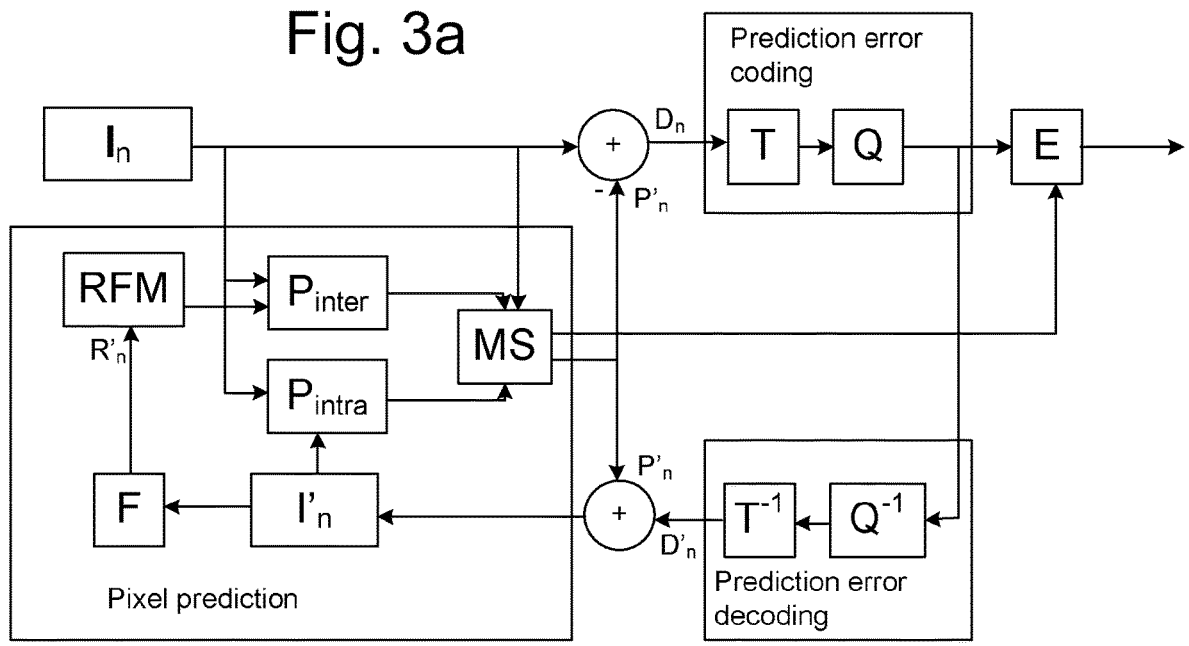
FIGS. 3a and 3b show an encoder and decoder for encoding and decoding texture pictures, geometry pictures and/or auxiliary pictures.
Figure 3B:
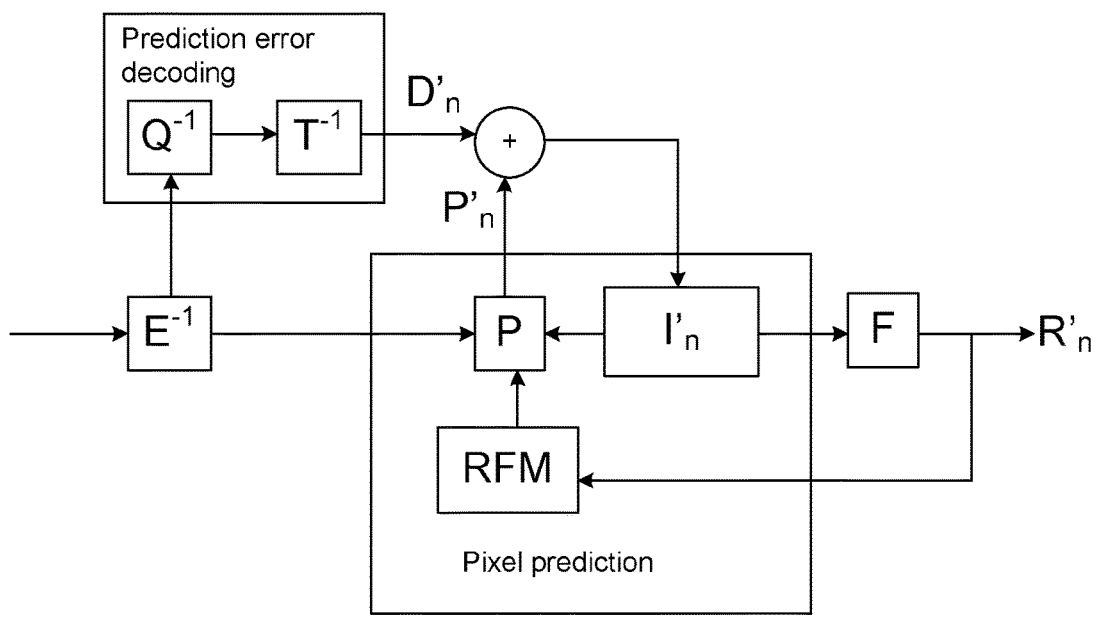

FIGS. 3a and 3b show an encoder and decoder for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (I''); a predicted representation of an image block (P'''); a prediction error signal (D''); a reconstructed prediction error signal (D'''); a preliminary reconstructed image (I'''); a final reconstructed image (R'''); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 3b. FIG. 3b illustrates a predicted representation of an image block (P'''); a reconstructed prediction error signal (D'''); a preliminary reconstructed image (I'''); a final reconstructed image (R'''); an inverse transform ($T^{-1}$); an inverse quantization ($Q^{-1}$); an entropy decoding ($E^{-1}$); a reference frame memory (RFM); a prediction (either inter or intra) (P); and filtering (F).

Figure 4A:
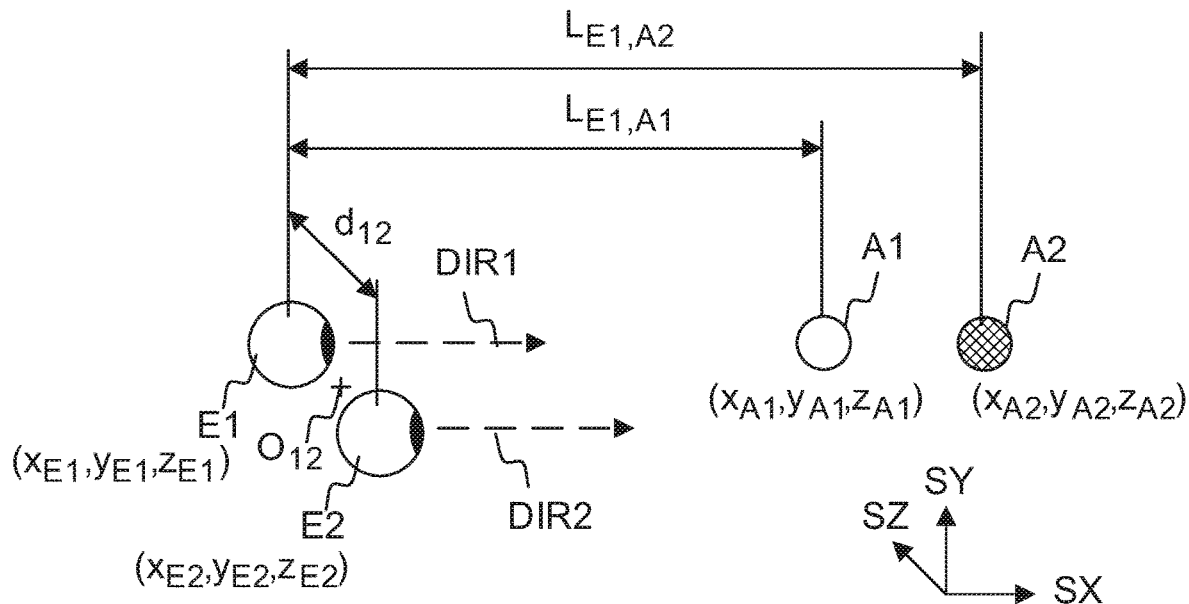
FIGS. 4a, 4b, 4c and 4d show a setup for forming a stereo image of a scene to a user.

FIGS. 4a, 4b, 4c and 4d show a setup for forming a stereo image of a scene to a user, for example a video frame of a 3D video. In FIG. 4a, a situation is shown where a human being is viewing two spheres A1 and A2 using both eyes E1 and E2. The sphere A1 is closer to the viewer than the sphere A2, the respective distances to the first eye E1 being $L_{E1,A1}$ and $L_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 4a, the spheres A1 and A2 are in the field of view of both eyes. The centre-point $O_{12}$ between the eyes and the spheres are on the same line. That is, from the centre-point, the sphere A2 is behind the sphere A1. However, each eye sees part of sphere A2 from behind A1, because the spheres are not on the same line of view from either of the eyes.

Figure 4B:
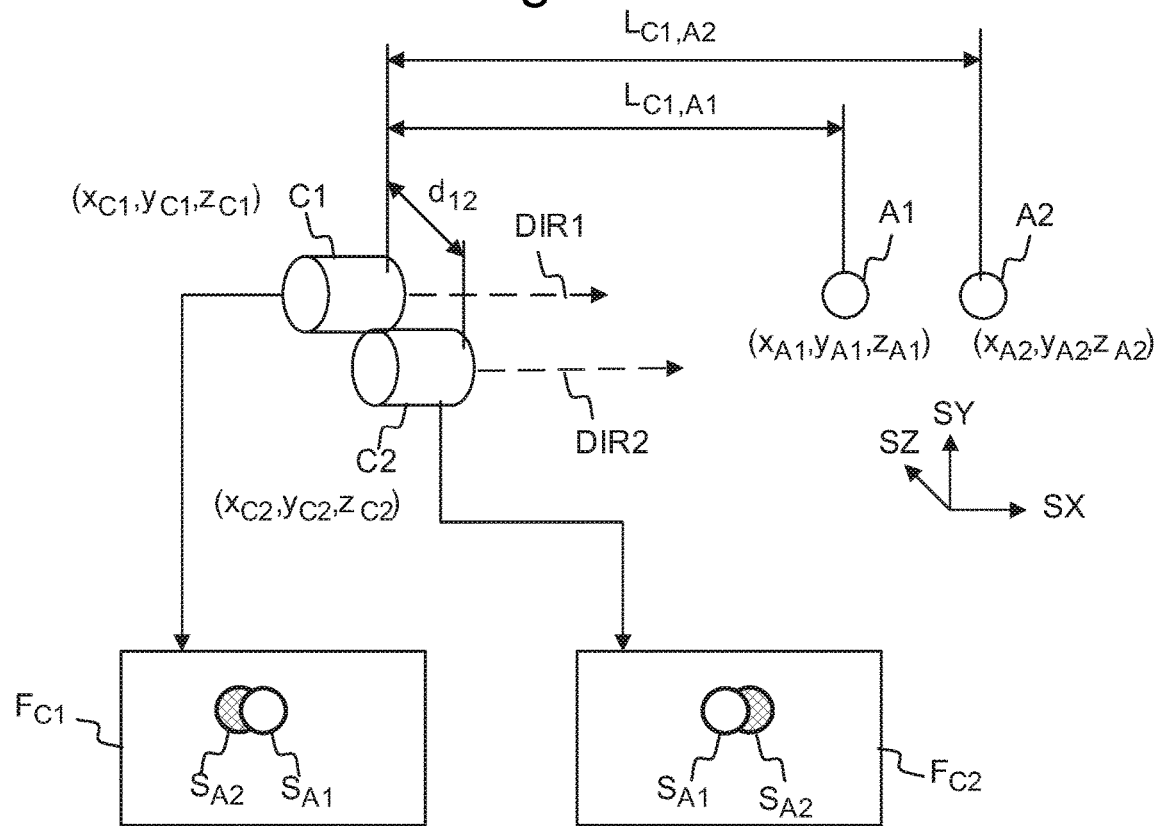

In FIG. 4b, there is a setup shown, where the eyes have been replaced by cameras C1 and C2, positioned at the location where the eyes were in FIG. 4a. The distances and directions of the setup are otherwise the same. Naturally, the purpose of the setup of FIG. 4b is to be able to take a stereo image of the spheres A1 and A2. The two images resulting from image capture are $F_{C1}$ and $F_{C2}$. The "left eye" image $F_{C1}$ shows the image $S_{A2}$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 4b, where the inter-eye distances correspond to those of the eyes in FIG. 4a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

It needs to be understood here that the images $F_{C1}$ and $F_{C2}$ may be captured by cameras C1 and C2, where the cameras C1 and C2 may be real-world cameras or they may be virtual cameras. In the case of virtual cameras, the images $F_{C1}$ and $F_{C2}$ may be computed from a computer model of a scene by setting the direction, orientation and viewport of the cameras C1 and C2 appropriately such that a stereo image pair suitable for viewing by the human visual system (HVS) is created.

Figure 4C:
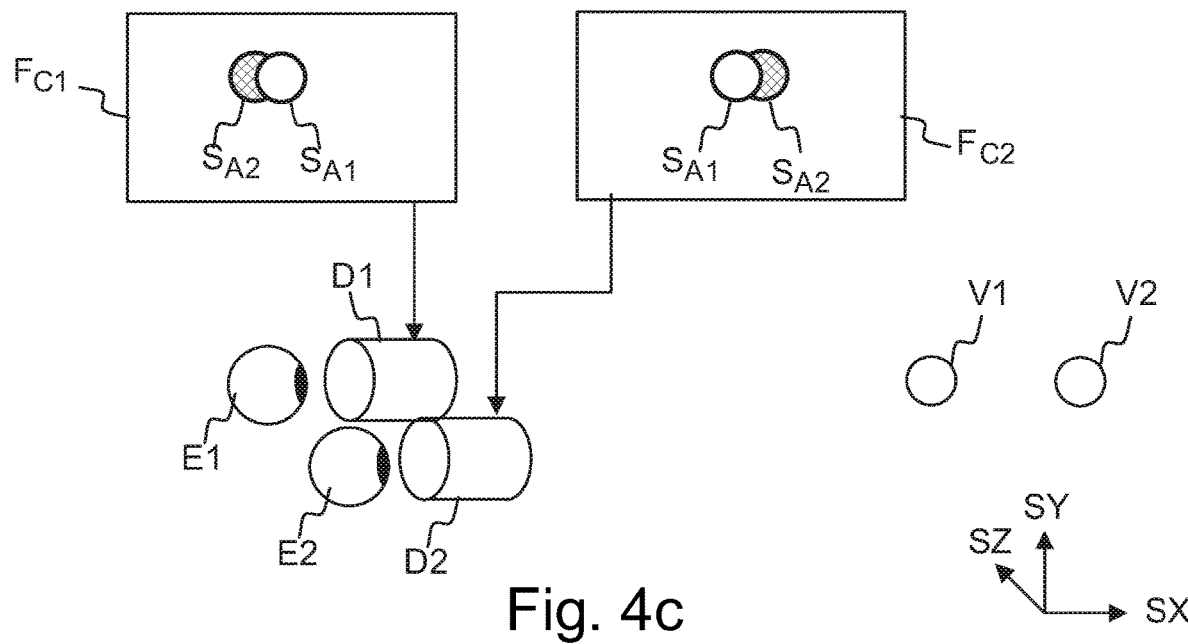

In FIG. 4c, the creating of this 3D illusion is shown. The images $F_{C1}$ and $F_{C2}$ captured or computed by the cameras C1 and C2 are displayed to the eyes E1 and E2, using displays D1 and D2, respectively. The disparity between the images is processed by the human visual system so that an understanding of depth is created. That is, when the left eye sees the image $S_{A2}$ of the sphere A2 on the left side of the image $S_{A1}$ of sphere A1, and respectively the right eye sees the image $S_{A2}$ of the sphere A2 on the right side, the human visual system creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the human visual system. That is, a pair of computer-generated images can be formed so that they can be used as a stereo image.

Figure 4D:
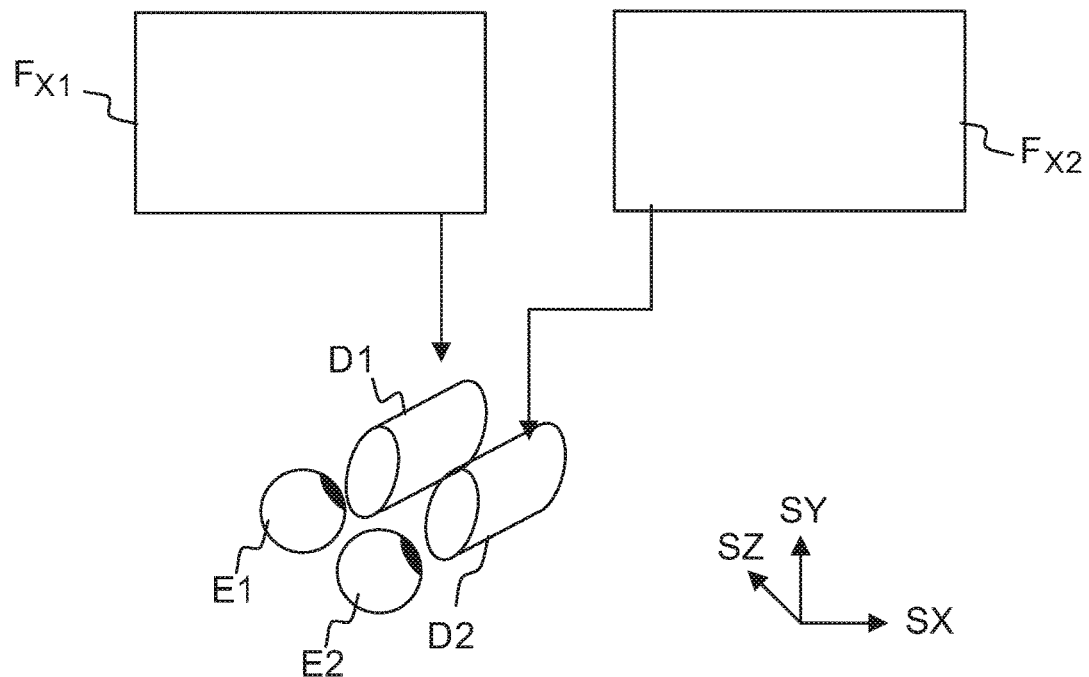

FIG. 4d illustrates how the principle of displaying stereo images to the eyes can be used to create 3D movies or virtual reality scenes having an illusion of being three-dimensional. The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the human visual system will create a cognition of a moving, three-dimensional image.

The field of view represented by the content may be greater than the displayed field of view e.g. in an arrangement depicted in FIG. 4d. Consequently, only a part of the content along the direction of view (a.k.a. viewing orientation) is displayed at a single time. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

The content may enable viewing from several viewing positions within the 3D space. The texture picture(s), the geometry picture(s) and the geometry information may be used to synthesize the images $F_{X1}$ and/or $F_{X2}$ as if the displayed content was captured by camera(s) located at the viewing position.

The principle illustrated in FIGS. 4a-4d may be used to create three-dimensional images to a viewer from a three-dimensional scene model (volumetric video) after the scene model has been encoded at the sender and decoded and reconstructed at the receiver. Because volumetric video describes a 3D scene or object at different (successive) time instances, such data can be viewed from any viewpoint. Therefore, volumetric video is an important format for any augmented reality, virtual reality and mixed reality applications, especially for providing viewing capabilities having six degrees of freedom (so-called 6DOF viewing).

Figure 5A:
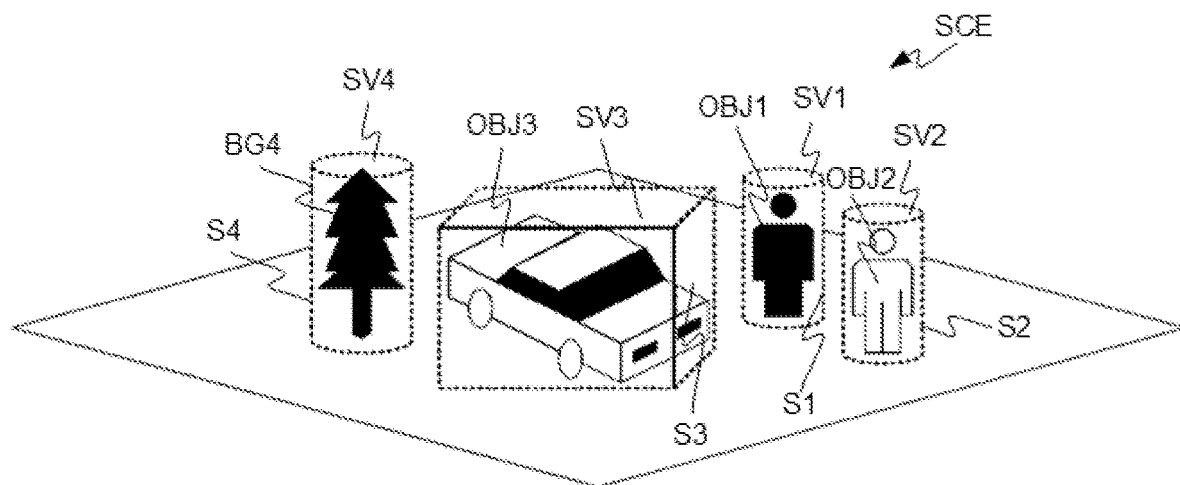
FIGS. 5a and 5b illustrate projection of source volumes in a scene and parts of an object to projection surfaces, as well as determining depth information.
Figure 5B:
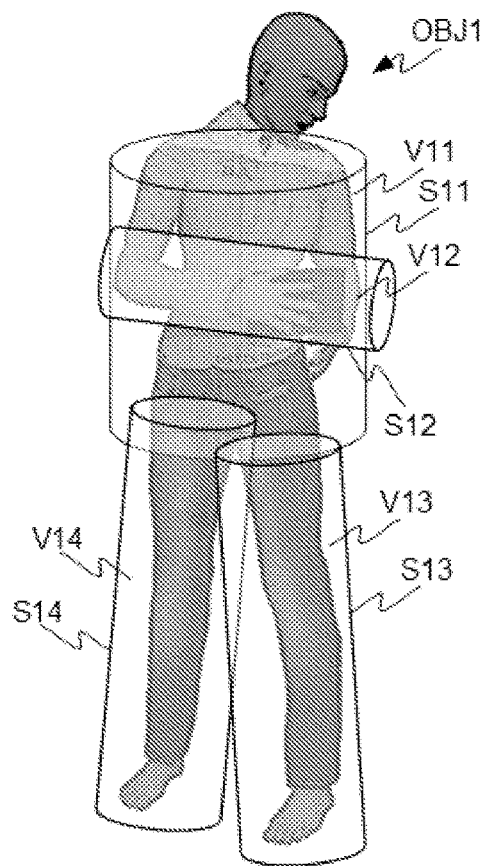

FIGS. 5a and 5b illustrate projection of source volumes in a digital scene model SCE and parts of an object model OBJ1, OBJ2, OBJ3, OBJ4 to projection surfaces S1, S2, S3, S4, S11-S14, as well as determining depth information for the purpose of encoding volumetric video.

The projection of source volumes SV1, SV2, SV3, SV4, V11-V14 may result in texture pictures and geometry pictures, and there may be geometry information related to the projection source volumes and/or projection surfaces. Texture pictures, geometry pictures and projection geometry information may be encoded into a bitstream. A texture picture may comprise information on the colour data of the source of the projection. Through the projection, such colour data may result in pixel colour information in the texture picture. Pixels may be coded in groups, e.g. coding units of rectangular shape. The projection geometry information may comprise but is not limited to one or more of the following:
- projection type, such as planar projection or equirectangular projection
- projection surface type, such as a cube
- location of the projection surface in 3D space
- orientation of the projection surface in 3D space
- size of the projection surface in 3D space
- sampling density of the projection surface in relation to 3D space
- type of a projection centre, such as a projection centre point, axis, or plane
- location and/or orientation of a projection centre.

The projection may take place by projecting the geometry primitives (points of a point could, triangles of a triangle mesh or voxels of a voxel array) of a source volume SV1, SV2, SV3, SV4, V11-V14 (or an object OBJ1, OBJ2, OBJ3, OBJ4) onto a projection surface S1, S2, S3, S4, S11-S14. The geometry primitives may comprise information on the texture, for example a colour value or values of a point, a triangle or a voxel. The projection surface may surround the source volume at least partially such that projection of the geometry primitives happens from the centre of the projection surface outwards to the surface. For example, a cylindrical surface has a centre axis and a spherical surface has a centre point. A cubical or rectangular surface may have centre planes or a centre point or centre axis and the projection of the geometry primitives may take place either orthogonally to the sides of the surface or from the centre point or centre axis towards the surface. The projection surfaces, e.g. cylindrical and rectangular, may be open from the top and the bottom such that when the surface is cut and rolled out on a two-dimensional plane, it forms a rectangular shape. Such rectangular shape with pixel data can be encoded and decoded with a video codec.

Alternatively, or in addition, the projection surface such as a planar surface or a sphere may be inside a group of geometry primitives, e.g. inside a point cloud that defines a surface. In the case of an inside projection surface, the projection may take place from outside in towards the centre and may result in sub-sampling of the texture data of the source.

In a point cloud scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture attribute values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the centre of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a planar or cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

Texture pictures may be encoded into a bitstream, and the texture pictures may comprise projection of texture data of source volumes SV1, SV2, SV3, SV4, V11, V12, V13, V14 of objects OBJ1 of a scene model SCE onto projection surfaces S1, S2, S3, S4, S11-S14.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive, such as a point to the projection surface, is determined for the pixels. Such depth data may be represented as a depth picture, and similarly to the texture picture, such geometry picture (in this example, depth picture) may be encoded and decoded with a video codec. These geometry pictures may be seen to represent a mapping of the projection surfaces to the source volumes, and the decoder may use this information to determine the location of geometry primitives in the model to be reconstructed. In order to determine the position of the source volumes and/or the projection surfaces and/or the projections in the scene model, there may be geometry information encoded into or along the bitstream.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate colour planes are in use, each of the two chroma arrays has the same height and width as the luma array.

It is possible to code sample arrays as separate colour planes into the bitstream and respectively decode separately coded colour planes from the bitstream. When separate colour planes are in use, each one of them is separately processed (by the encoder and/or the decoder) as a picture with monochrome sampling.

Texture picture(s) and the respective geometry picture(s) may have the same or different chroma format.

Depending on the context, a pixel may be defined to a be a sample of one of the sample arrays of the picture or may be defined to comprise the collocated samples of all the sample arrays of the picture.

Multiple source volumes (objects) may be encoded as texture pictures, geometry pictures and projection geometry information into the bitstream in a similar manner. That is, as in FIG. 5a, the scene model SCE may comprise multiple objects OBJ1, OBJ2, OBJ3, OBJ4, and these may be treated as source volumes SV1, SV2, SV3, SV4 and each object may be coded as a texture picture, geometry picture and projection geometry information.

As shown in FIG. 5b, a single object may be composed of different parts and thus different source volumes V11, V12, V13, V14 and corresponding projection surfaces S11, S12, S13, S14 may be used for these different parts.

In the above, the texture pictures of the source volumes and further texture pictures of possible other source volumes may represent the same time instance. That is, there may be a plurality of texture and geometry pictures and projection geometry information for a single time instance, and the other time instances may be coded in a similar manner. Since the various source volumes are in this way producing sequences of texture pictures and sequences of geometry pictures, as well as sequences of projection geometry information, the inter-picture redundancy in the picture sequences can be used to encode the texture and geometry data for the source volumes efficiently, compared to the presently known ways of encoding volume data.

There may be one or more coordinate systems in the scene model. The scene model may have a coordinate system, and one or more of the objects (source volumes) in the scene model may have their local coordinate systems. The shape, size, location and orientation of one or more projection surfaces may be encoded into or along the bitstream with respect to the scene model coordinates. Alternatively, or in addition, the encoding may be done with respect to coordinates of the scene model or said first source volume. The choice of coordinate systems may improve the coding efficiency.

Information on temporal changes in location, orientation and size of one or more said projection surfaces may be encoded into or along the bitstream. For example, if one or more of the objects (source volumes) being encoded is moving or rotating with respect to the scene model, the projection surface moves or rotates with the object to preserve the projection as similar as possible.

If the projection volumes are changing, for example splitting or bending into two parts, the projection surfaces may be sub-divided respectively. Therefore, information on sub-division of one or more of the source volumes and respective changes in one or more of the projection surfaces may be encoded into or along the bitstream.

The resulting bitstream may then be output to be stored or transmitted for later decoding and reconstruction of the scene model.

A standard 2D video encoder may then receive the planes as inputs, either as individual pictures or layers per object, or as a frame-packed representation of all objects. The texture picture may thus comprise a plurality of projections of texture data from further source volumes and the geometry picture may represent a plurality of mappings of projection surfaces to the source volume.

For each object, additional information may be signalled to allow for reconstruction at the decoder side:
in the case of a frame-packed representation: separation boundaries may be signalled to recreate the individual planes for each object,
in the case of projection-based compression of static content: classification of each object as static/dynamic may be signalled,
relevant data to create real-world geometry data from the decoded (quantised) geometry channel(s), e.g. quantisation method, depth ranges, bit depth, etc. may be signalled, initial state of each object: geometry shape, location, orientation, size may be signalled, temporal changes for each object, either as changes to the initial state on a per-picture level, or as a function of time may be signalled, and nature of any additional auxiliary data may be signalled.

For the described example above, signalling may, for example, be as follows:

```
NUM_OBJECTS      4              // folding-chair, TV, person body, person head
FRAME_PACKED     0              // individual inputs
for i=0:NUM_OBJECTS             // initial states for each projection
    PROJ_GEO                    // geometry, e.g. 0: cube, 1: cylinder, 2: sphere, ...
    PROJ_CENTRE_X/Y/Z           // projection centre in real world coordinates
    PROJ_SIZE_X/Y/Z             // projection dimensions in real world units
    PROJ_ROTATION_X/Y/Z         // projection orientation
    PROJ_STATUS                 // 0: dynamic 1:static
    DEPTH_QUANT                 // depth quantisation, i.e. 0 for linear, ...
    DEPTH_MIN                   // minimum depth in real world units
    DEPTH_MAX                   // maximum depth in real world units
end
for n=0:NUM_FRAMES
    for i=0:NUM_OBJECTS
        CHANGE   1              // i.e. 0=static, 1=translation, 2=trans+rotation, ...
        TRANS_VEC               // translation vector
        ...                     // relevant data to represent change
    end
end
```

The decoder may receive the static 3D scene model data together with the video bitstreams representing the dynamic parts of the scene model. Based on the signalled information on the projection geometries, each object may be reconstructed in 3D space and the decoded scene model is created by fusing all reconstructed parts (objects or source volumes) together.

Standard video encoding hardware may be utilized for real-time compression/decompression of the projection surfaces that have been unfolded onto planes.

Simple objects might suffice to be projected and coded with a single projection. Complex objects or larger scene models may require several (different) projections. The projection geometry may remain constant over a volumetric video sequence, but the location and orientation of the projection surfaces in space can change (and can be possibly predicted in the encoding, wherein the difference from the prediction is encoded).

Projecting 3D data onto 2D planes is independent from the 3D scene model representation format. There exist several approaches for projecting 3D data onto 2D planes, with the respective signalling. For example, there exist several mappings from spherical coordinates to planar coordinates, known from map projections of the globe, and the type and parameters of such projection may be signalled. For cylindrical projections, the aspect ratio of height and width may be signalled.

Figure 6:
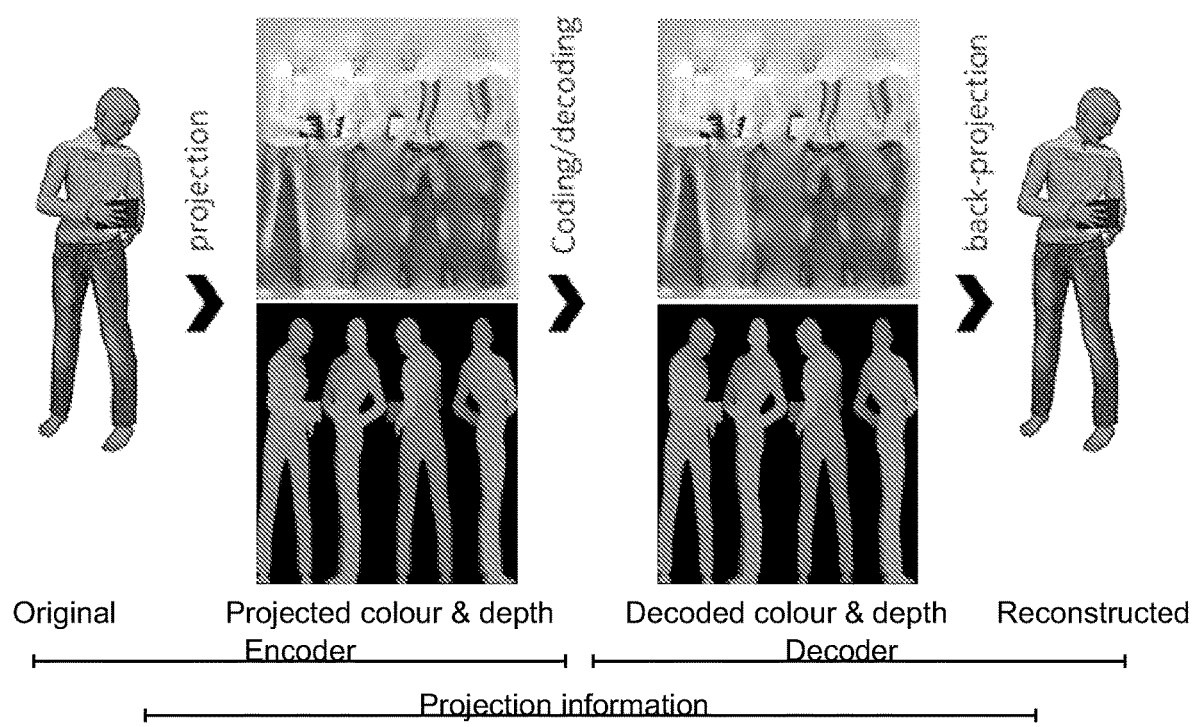
FIG. 6 illustrates a projection onto four sides of a cube and the respective reconstruction.

A 3D object, represented as meshes, points, and/or voxels, is projected onto one or more geometries. These geometries are unfolded onto two 2D planes per geometry: one plane for texture and one plane for depth. FIG. 6 illustrates such a projection onto four sides of a cube and the respective reconstruction, whereas the projection planes T for texture and D for depth/geometry have a resolution of M×4N pixel (1N for each side=4N). Relevant projection geometry information may be transmitted alongside the encoded video files to the decoder. The decoder may then decode the video and perform the inverse projection to regenerate the 3D scene model object in any desired representation format, which may be different from the starting format e.g. reconstructing a point cloud from original mesh model data.

For the illustrated planar projection in FIG. 6, a point $p(x,y,z)$ in 3D space $P(X,Y,Z)$ would be represented by its texture information (e.g. RGB values) with $T(x,y)=[Rp, Gp, Bp]$ and its geometry information with $D(x,y)=z$. Typically the resolutions of the projection planes are lower than the bounding box of the volumetric data, i.e. $M<Y$ and $N<X$, thus subsampling occurs as neighbouring points in 3D space are mapped onto the same coordinates in the texture plane T and the depth/geometry plane D. Usually Z-buffering is then applied to ensure only the most outward facing point in 3D space is mapped onto the 2D plane to avoid incorrect surfaces, i.e. only keep the point with the closest distance to the projection geometry surface.

Figure 8A:
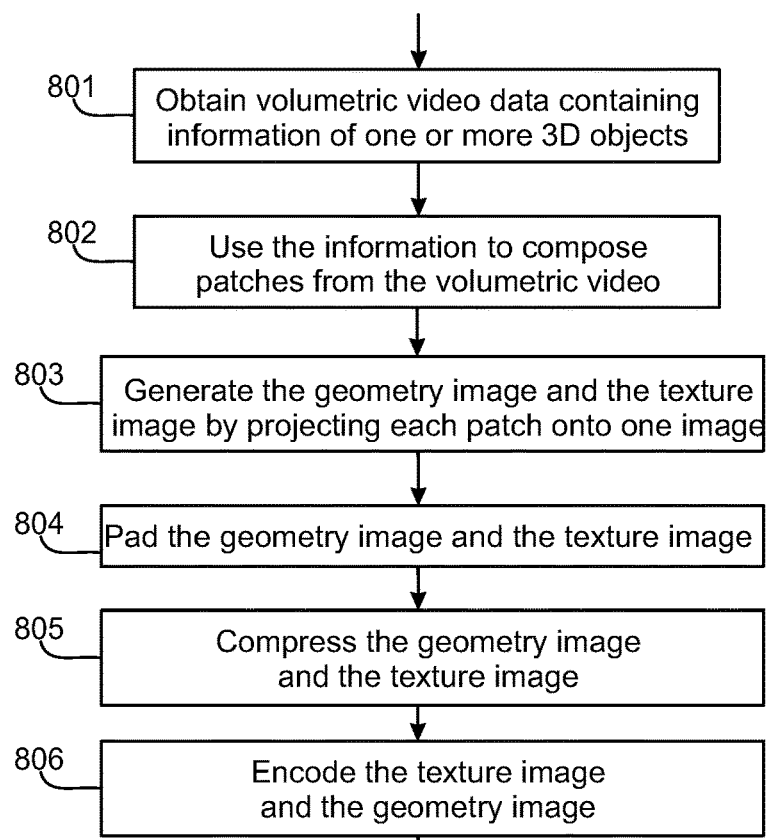
FIG. 8a shows a flow chart for compressing encoding of a scene of a volumetric video.
Figure 8B:
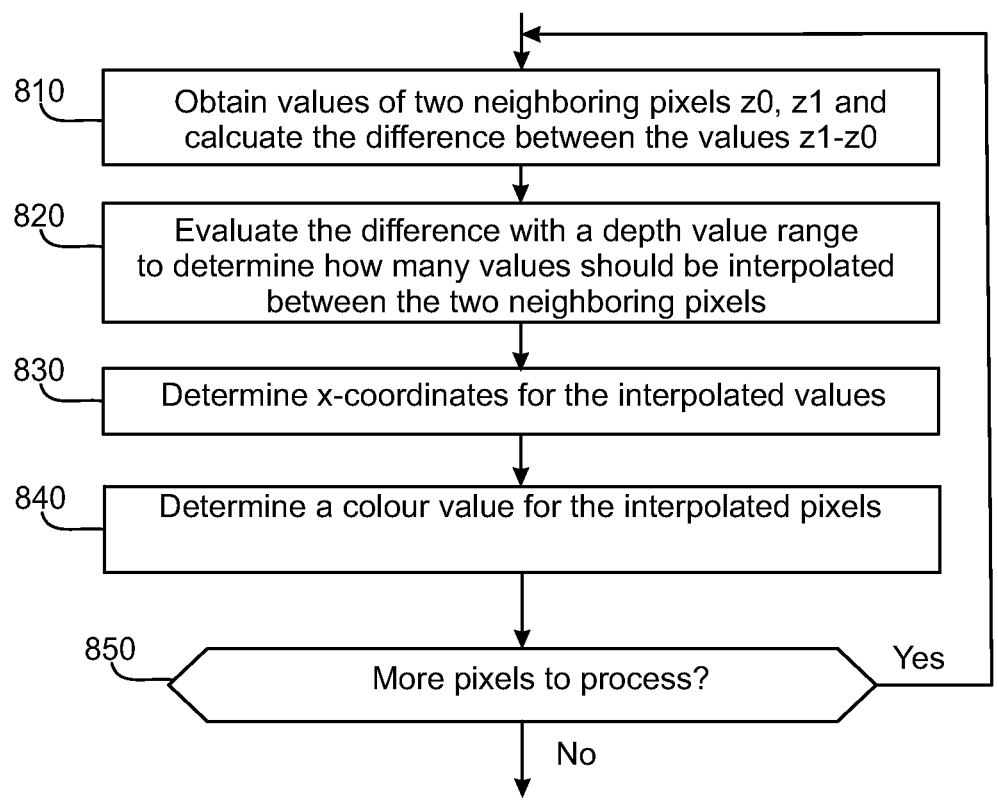
FIG. 8b shows an example flow chart for depth gradient point cloud interpolation along the x-coordinate axis at the decoder.
Figure 9A:
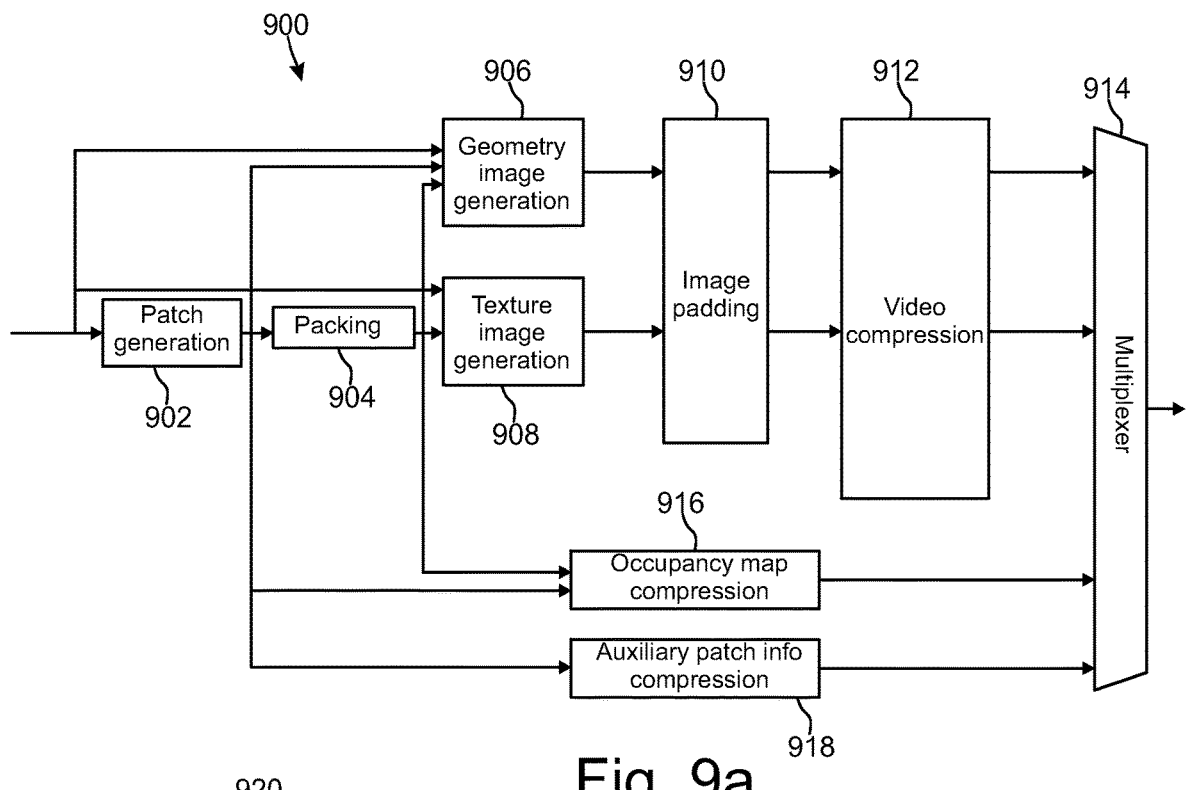
FIG. 9a illustrates an example of an encoding element.
Figure 9B:
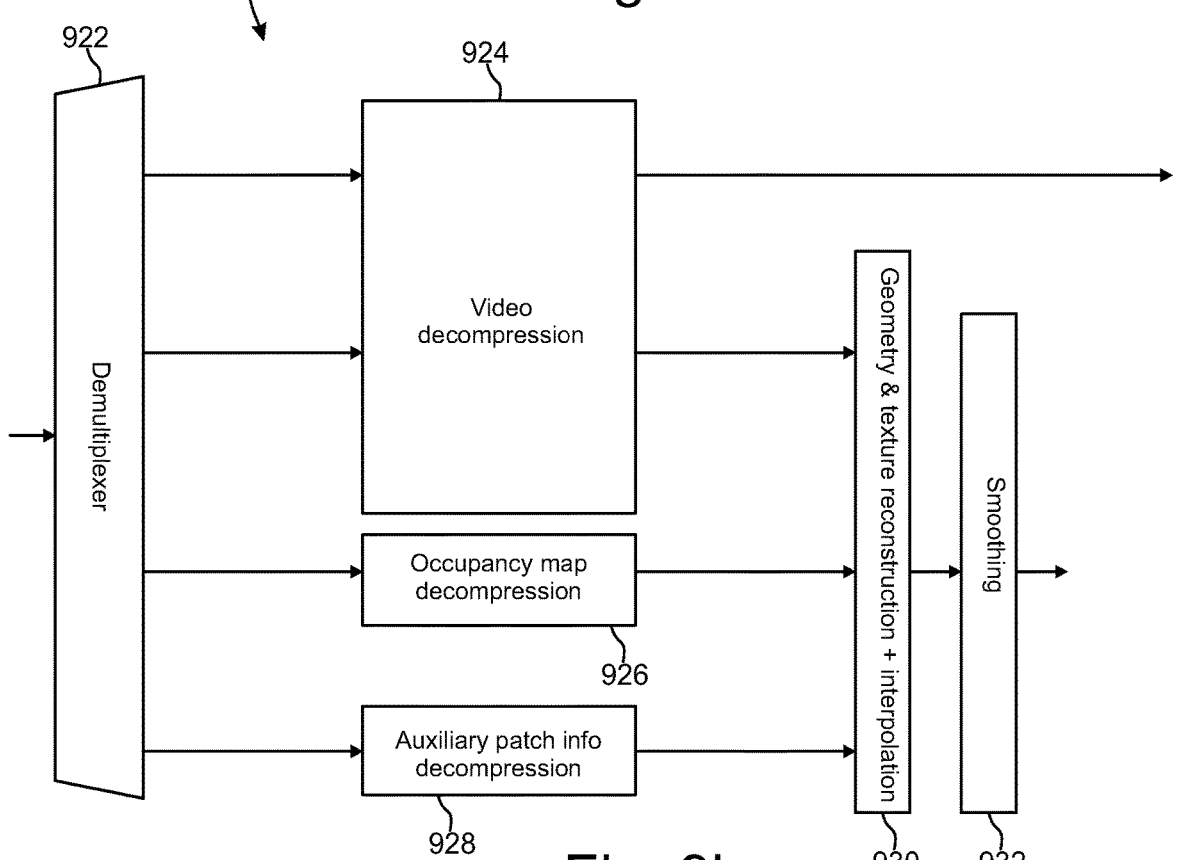
FIG. 9b illustrates an example of a decoding element.

FIGS. 9a and 9b provide an overview of an example of compression and decompression processes, respectively, and FIGS. 8a and 8b show flow charts for encoding and interpolating of a scene of a volumetric content such as a volumetric video, in accordance with an embodiment. A point cloud is received 801 by a patch generator 902 in which a patch generation process aims at decomposing 802 the point cloud into a minimum number of patches with smooth boundaries, while also minimizing the reconstruction error. This may be performed by, for example, the following approach.

First, the normal at every point is estimated and an initial clustering of the point cloud is then obtained by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0).

More precisely, each point is associated with the plane that has the closest normal (e.g. maximizes the dot product of the point normal and the plane normal).

The initial clustering is then refined by iteratively updating the cluster index associated with each point based on its normal and the cluster indices of its nearest neighbors. The final step consists of extracting patches by applying a connected component extraction procedure.

Figure 7A:
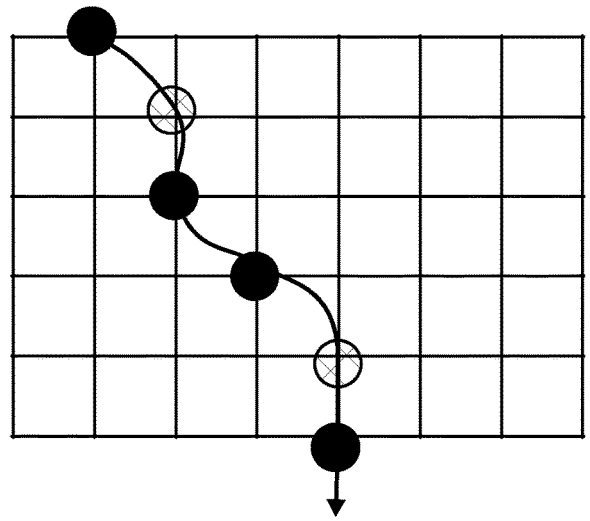
FIG. 7a illustrates an example of a projection of multiple points on the same pixel location, and a layered solution.
Figure 7A:
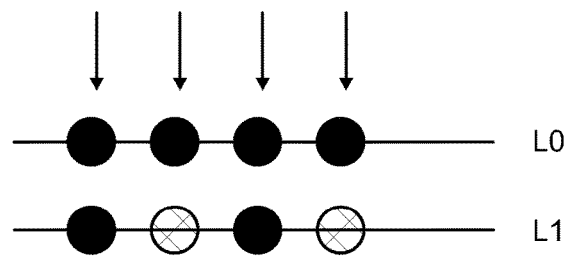
Figure 7B:
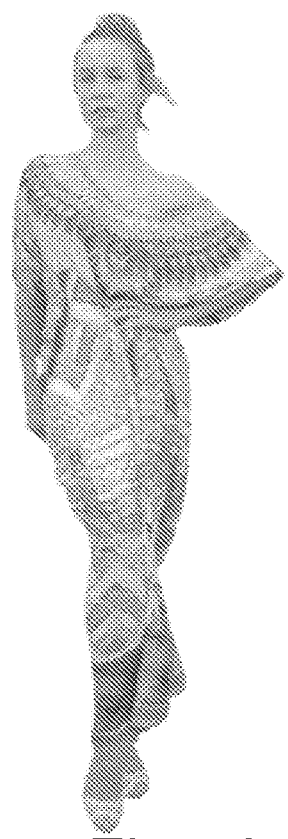
FIG. 7b illustrates an example of an input point cloud.
Figure 7C:
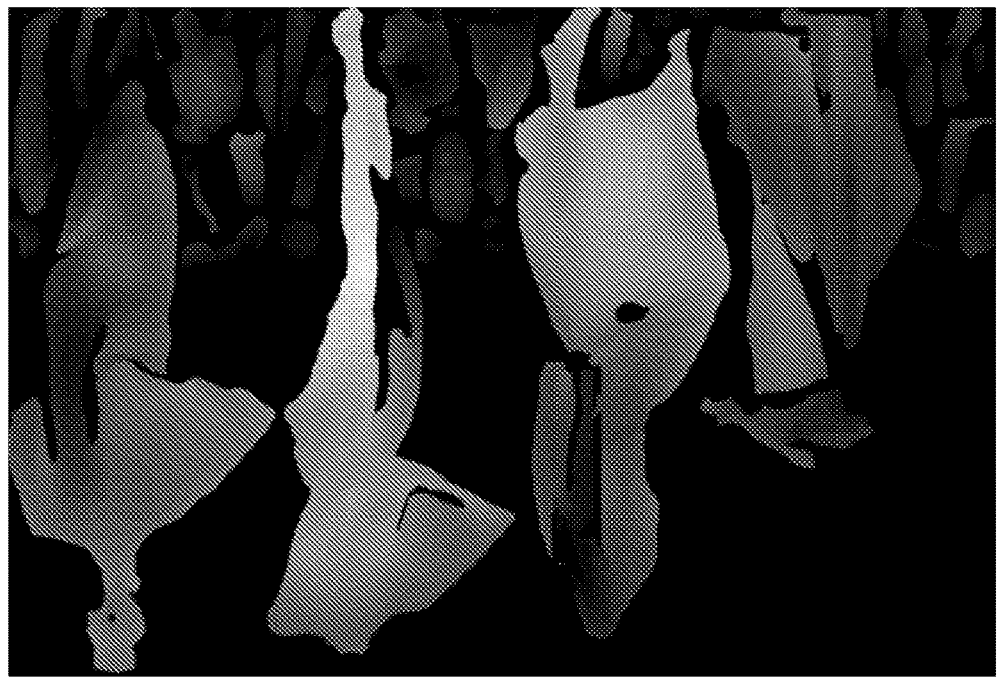
FIG. 7c illustrates a depth image at a first layer projected from the point cloud of FIG. 7b.
Figure 7D:
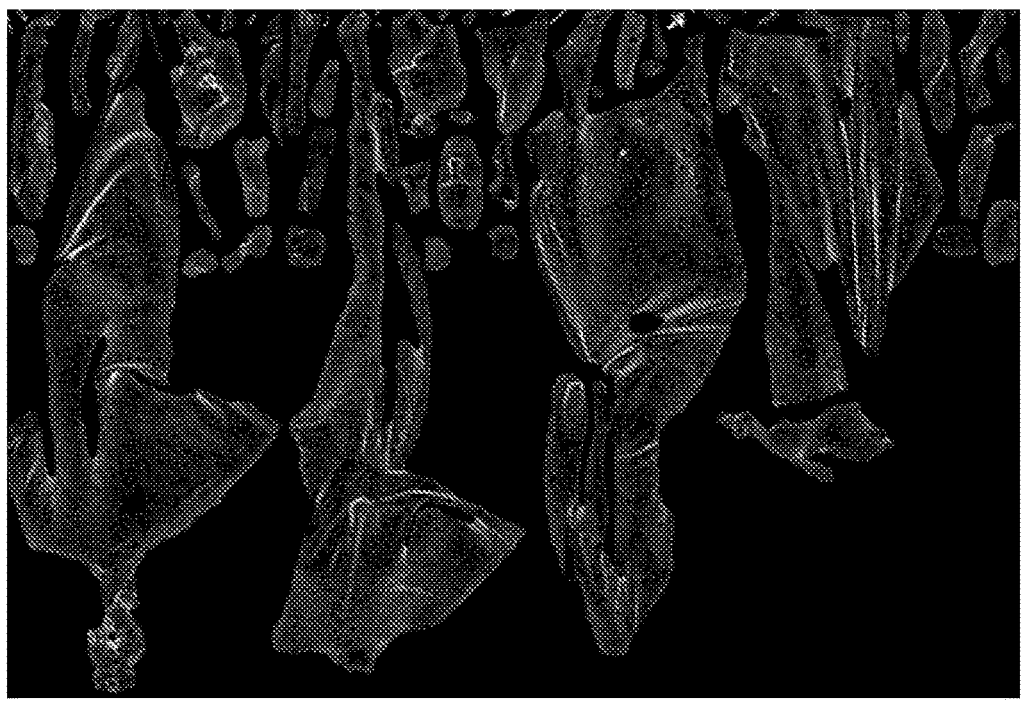
FIG. 7d illustrates a depth image at a second layer projected from the point cloud of FIG. 7b.
Figure 7E:
FIG. 7e illustrates the reconstruction of FIG. 7d after decoding.
Figure 7F:
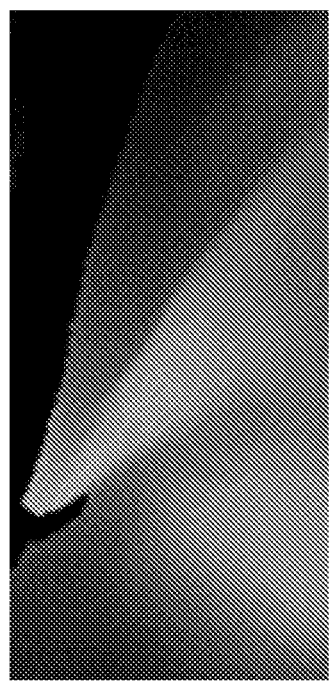
FIG. 7f illustrates a detail of the depth image of FIG. 7c with increased contrast for better visibility.
Figure 7G:
FIG. 7g illustrates an example of packing.

The extracted patches are provided to a packing element 904 in which the packing process aims at mapping the extracted patches onto a 2D grid (FIG. 7g), while trying to minimize the unused space, and trying to guarantee that every T×T (e.g., 16×16) block of the grid is associated with a unique patch. The parameter T may be a user-defined parameter that is encoded in the bitstream and sent to the decoder. In FIG. 7g white areas illustrate empty pixels.

An image generation process performs 803 both a geometry image generation 906 and a texture image generation 908 by applying the 3D to 2D mapping computed during the packing process to store the geometry and texture of the point cloud as images. Each patch is projected onto one image, which may also be referred to as a layer. More precisely, let H(u,v) be the set of points of the current patch that get projected to the same pixel (u, v). If more than one 3D point is projected to the same location on the current patch, a single value for that location H(u,v) may be selected. The layer stores the point of H(u,v) with the closest distance to its projection surface, e.g. the lowest depth D0. The generated videos may have the following characteristics, for example:

Geometry: width (W)×height (H) YUV420-8 bit,
Texture: width (W)×height (H) YUV420-8 bit,
It should be noted that that the geometry video is monochromatic.

The geometry image and the texture image may be padded 804 to fill the complete 2D image by an image padding element 910. The padded geometry image and the padded texture image are provided to a video compression element 912 for compressing 805 the padded geometry image and the padded texture image, from which the compressed geometry and texture images are provided, for example, to a multiplexer 914 which multiplexes 806 the input data to a compressed bitstream(s). There may also be an occupancy map compression element 916 and an auxiliary patch information compression element 918 for compressing an occupancy map and auxiliary patch information, respectively, before providing the compressed occupancy map and auxiliary patch information to the multiplexer 914.

In accordance with an embodiment, the selecting of a single value may comprise obtaining the geometry information of the three-dimensional objects presented in the volumetric content; and using a weighted average value of the projected 3D points on the same location of the patch, wherein the weighting is based on the closeness of 3D points to the projection plane.

In accordance with another embodiment, the selecting of a single value may comprise at least one of using a mean value of the projected 3D points on the same location of the patch; using a median value of the projected 3D points on the same location of the patch; using a maximum value of the projected 3D points on the same location of the patch; or using a minimum value of the projected 3D points on the same location of the patch.

FIG. 9b depicts some elements of a decoder 920, in accordance with an embodiment. A demultiplexer 922 demultiplexes different information streams to correct decoding elements. The compressed geometry image and the compressed texture images are provided to a video decompression element 924 for decompressing to obtain decompressed geometry image and decompressed texture image. The compressed occupancy map is provided to an occupancy map decompressing element 926 to obtain a decompressed occupancy map and the compressed auxiliary patch information is provided to an auxiliary patch information decompressing element 928 to obtain decompressed auxiliary patch information. A reconstruction element 930 uses the decompressed information to reconstruct the geometry image and the texture image. The reconstructed geometry image may be smoothened by a smoothing element 932.

In projection-based volumetric video compression, a 3D surface is projected onto a 2D grid. Naturally, this 2D grid has a finite resolution, thus it could happen that two or more points of the 3D surface are projected on the same 2D pixel location, e.g. the hashed points in FIG. 7a.

In a current solution (MPEG TCM2 test model), along each projection line, two depth values, D0 and D1 (D0<=D1 and (D1−D0)<=SurfaceThickness), are recorded. Accordingly, two texture and geometry images (layers), e.g. depthImg0 and depthImg1, are created per input point cloud. FIG. 7b illustrates an example of an input point cloud; FIG. 7c illustrates a depth image at a first layer coded from the point cloud of FIG. 7b; FIG. 7d illustrates a depth image at a second layer coded from the point cloud of FIG. 7b; and FIG. 7e illustrates a result of encoding of FIG. 7d using certain coding parameters (geometry QP=14).

Both images share the same occupancy map, the only difference being the value stored at each occupied position; i.e. pixel p0 at coordinates (u, v) from depthImg0 stores D0, and pixel p1 at the same coordinates (u, v) from depthImg1 stores the difference between D0 and D1, corresponding to two 3D points that differ, at most, by the predefined value SurfaceThickness=4.

In the depth images depthImg0 and depthImg1, for two 3D points, P0 and P1, projected to coordinates (u, v) generating D0 and D1, respectively, the value of pixel p0 at coordinates (u, v) in depthImg0 is proportional to the value of the projected component of P0, whereas the value of pixel p1 at coordinates (u,v) from depthImg1 is the difference between the projected component of P1 and P0.

The characteristics of the depthImg1 image, which essentially contains contour-like, high frequency features, make it difficult to faithfully encode using traditional video codecs. Such features are mostly lost in the decoded depthImg1 image in spite of having used high encoding quality settings.

According to an embodiment, there is provided an improvement to projection-based point cloud compression. Instead of two texture and two geometry layers or two texture and one geometry layer, only a single layer per texture and geometry is coded.

At the encoder side, only the texture and depth value for a 3D point at D0 is stored. Possibly occluded points will be reconstructed at the decoder side, based on the geometry image information. Because only textureImage1 and depthImg1 are encoded, no geometry reconstruction or smoothing steps are required at the encoder.

One key feature is utilization of a geometry gradient-based point interpolation, which is performed during the 2D->3D projection in a decoder.

Furthermore, this interpolation is performed for both geometry and texture information.

In the following, the geometry gradient-based interpolation will be described in more detail, in accordance with an embodiment. FIG. 7f illustrates a detailed patch taken from FIG. 7c. In this example, brightness and contrast is increased for better visibility. The depth value gradient is clearly visible. The gradient between neighbouring pixels is directly proportional to any possible surface sub-sampling (as illustrated in FIG. 7a). Thus, the difference of the depth signal provides a measure for the required point interpolation. As the depth is typically regularly quantised, the number of desired interpolation points can be derived directly from this difference value.

Figure 7H:
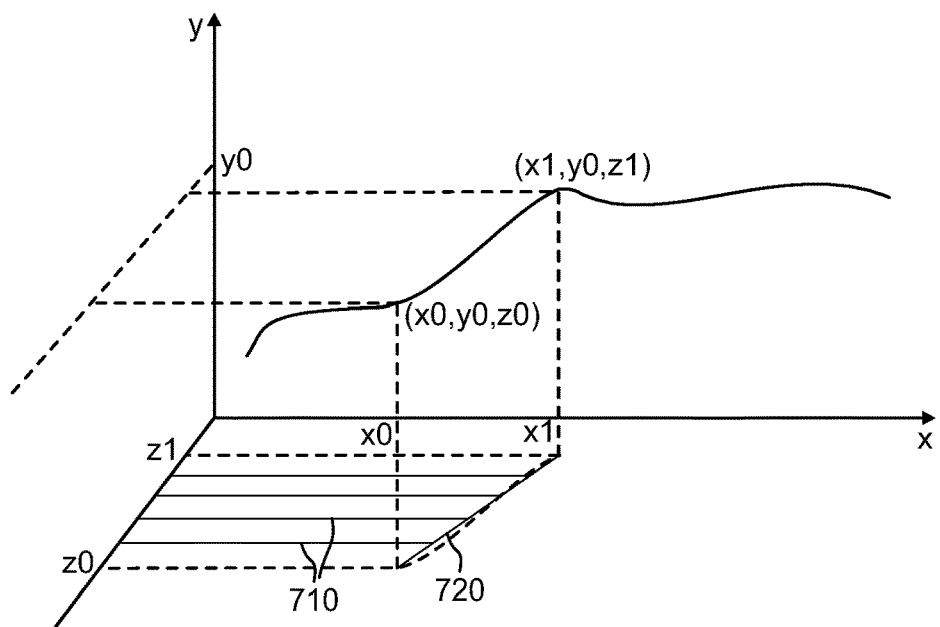
FIG. 7h illustrates an example of a gradient-based point interpolation principle.

The main steps of an example embodiment are described as follows, with reference to the flow diagram of FIG. 8b and the example of a gradient in FIG. 7h:

In Step 810 two neighboring pixel values, z0 at position [x0,y0] and z1 at position [x1,y0], will be processed and a difference of the pixel values Diff=z1-z0 is calculated. Let z1=10 at position [x1,y0] be the currently processed depth pixel and z0=36 at position [x0,y0] be a previously processed neighbouring pixel, i.e. in x-direction, the interpolation process would derive an absolute difference Diff between z0 and z1 of 26.

In Step 820 the amount of the difference Diff with respect to a depth value range DRange is evaluated (Diff/DRange). The depth value range may be determined on the basis of a minimum allowed depth value and a maximum allowed depth value. The minimum allowed depth value and the maximum allowed depth value may depend on a size of a variable to indicate the depth value, such as a number of bits of the depth value. It may also be assumed in this example embodiment that 8 bits are used to represent the depth value, wherein the depth value range is from 0 to 255, so the difference Diff is roughly 10% of the depth range DRange. A decoder interpolation parameter IP, which may be set at the decoder, or is predefined on encoder side and sent in the bitstream, or is a user setting at the player, etc., is set to a certain value, such as 2% in this example. This means that for every 2% depth value range, a new 3D point should be interpolated. It should be noted that any value percentage can be chosen. Also, instead of a percentage, an absolute depth value could be chosen as interpolation parameter IP, e.g. a new 3D point shall be interpolated at every n values difference.

Thus, in this example a total of 4 points will be interpolated in the Step 830, and they will have the depth values 15.1, 20.2, 25.3, 30.4 for the case of a 2% depth value range interpolation factor (for an absolute depth value parameter, e.g. n=2, the values would be 12, 14, 16, . . . , 34, and a total of 12 points would be interpolated). They will all have the same y-coordinate y0 (horizontal processing) for reprojection. They will be reconstructed from the following x coordinates (4*x0+x1)/5, (3*x0+2*x1)/5, (2*x0+3*x1)/5, (x0+4*x1)/5. The horizontal lines 710 between z0 and z1 in FIG. 7h illustrate these points and the line 720 illustrates the interpolation values in the z-plane.

In Step 840 the color values will be obtained. The color values for each interpolated point will be taken from the texture image points t0 and t1 (the same coordinates as d0 and d1) with the following weighting (4*t0+t1)/5, (3*t0+2*t1)/5, (2*t0+3*t1)/5, (t0+4*t1)/5 (simple interpolation based on the depth information from the previous interpolation step 830).

The steps 810-840 may be repeated 850 for the whole geometry and texture image.

The texture reconstruction is already performed during the geometry reconstruction, wherein no post-smoothing texture reconstruction is required.

Geometry smoothing can be applied as in the prior-art. No intra-patch geometry smoothing is required.

It shall be noted that this example describes interpolation in x-direction. Interpolation in y-direction is another option and both are typically performed consecutively. Optionally, two-dimensional interpolation in x- and y-direction can be performed simultaneously.

In accordance with an embodiment, neighboring pixels of a location on the 2D image may be obtained based on the geometry information. A difference of values of the neighboring pixels on the 2D image may be determined. The difference may be compared with a value range to determine a number of 3D points to be interpolated. The 2D image may be projected back to create the volumetric content; wherein the projection may comprise interpolating the number of 3D points on the basis of the values of the neighboring pixels.

Embodiments of the present invention may require less bit rate at the cost of slight increase of decoder complexity, compared to prior art. There is also improved buffer memory utilization both at the encoder and the decoder side.

Interpolating points based on the geometry gradient and assigning colour values based on 2D texture image interpolation may avoid computational more complex operations in 3D space.

In the following, some details will be shortly provided regarding the encoder.

In an embodiment, one geometry and one texture image are created per input cloud by the encoder. The patches in the texture and geometry image describe either the near or the far layer. It is not necessary that geometry and texture describe the same layer, e.g. texture patches could describe the far layer and geometry patches describe the near layer. It is also not necessary that all patches in an image, geometry or texture, describe the same layer, i.e. patches from the far and near layer may be present in the same picture.

The encoder may decide on which layer of a patch is selected based on a rate-distortion optimization, or other metrics, e.g. the distance of a patch in 3D space to a projection surface.

In the following, some details will be shortly provided regarding the decoder.

In an embodiment, instead of the depth difference, the derivate of the depth gradient is used to determine the interpolation function by the decoder. This could either be the 1D derivate for x and y direction (performed individually as z/dx and z/dy) or the 2D-derviate to perform the interpolation in one step (z/dxdy). Such an approach can represent non-linear depth gradients better than the simple difference approach.

In an embodiment, where the depth information in the geometry does not follow linear quantization, the same quantization is applied for determining the new depth values for the interpolated 3D points.

In an embodiment, the depth interpolation weighting is derived from a 2D gaussian filter centred at the desired reconstruction coordinate in the geometry picture (spatial kernel), taking only valid values into account.

In an embodiment, instead of the depth weighted interpolation, a depth-guided bilateral filter is used for interpolating new geometry values, where depth z (geometry image) guides the range kernel (intensity) and the spatial kernel is based on the coordinate differences in the geometry image.

In an embodiment, instead of the depth weighted interpolation, a depth-guided joint bilateral filter is used for interpolating new texture values, where depth z (geometry image) guides the range kernel (intensity) and the spatial kernel is based on the coordinate differences in the texture image.

In yet another embodiment, iterative depth-guided (joint) bilateral filters are used to generate new geometry or texture values. Instead of standard bilateral filters, which create all values in the same direction, such a filter works from "both sides". I.e. if the aim is to recreate 5 values between d0 and d6, it will create the first value d1' closest to d0, the next value d5' closest to d6, the next value d2' closest to d1', then d4' closest to d5' and so on.

In another embodiment, instead of difference or derivate, a non-linear function is modelled from available depth values using some curve- or surface-fitting solutions. Interpolation steps and interpolation values can be directly estimated from such a function. Such an approach may be computationally more expensive, but might provide the best representation of non-linear depth gradients. However, as the depth patches describe coherent surface patches, the amount of non-linearity is expected to be rather low. The previous, more simple approaches should work just as good for the current target content. In the future, where more complex models and scenes might get encoded, such an interpolation approach may be more feasible.

In an embodiment, the interpolation technique for the texture values is the same as the interpolation technique for geometry.

In an embodiment, the interpolation technique for the texture values is different from the interpolation technique for geometry.

In an embodiment, texture and geometry interpolation techniques are hard-coded in the decoder.

In another embodiment, the decoder derives the texture or geometry interpolation technique from the received depth values. E.g. if a large depth difference is detected, a more sophisticated interpolation approach is chosen, while a smaller depth difference may be interpolated with simple weighted averaging.

In an embodiment, the texture interpolation technique is derived from the geometry interpolation technique.

In an embodiment, the texture interpolation technique is derived from the reconstructed geometry values. E.g. if the geometry interpolation step generated a large number of new 3D points, a more complex interpolation such as iterative bilateral filtering might be applied to generate more precise texture values. If less new 3D points are created, simple depth-weighted interpolation might be sufficient.

In yet another embodiment, preferred interpolation techniques are derived during the encoding, e.g. as a RDO decision. In this case the best interpolation technique (for texture, geometry or both) may be signalled on a per-sequence, per-frame, or per-patch level.

In another embodiment, a non-linear interpolation function is modelled at the encoder and its coefficients are transmitted to the decoder to guide the geometry and/or texture interpolation.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, some embodiments have been described with reference to encoding or decoding texture pictures, geometry pictures and projection geometry information into or from a single bitstream. It needs to be understood that embodiments can be similarly realized when encoding or decoding texture pictures, geometry pictures and projection geometry information into or from several bitstreams that are associated with each other, e.g. by metadata in a container file or media presentation description for streaming.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:
1. A method comprising:
obtaining a two-dimensional image containing visual information of three-dimensional objects;
obtaining at least one patch of the two-dimensional image;
based on a determination that a plurality of three-dimensional points are projected to a same location on the at least one patch, interpolating the plurality of three-dimensional points for that location, wherein the interpolating comprises:
obtaining a geometry information of the three-dimensional objects,
obtaining neighboring pixels of the location based on said geometry information, determining a difference of values of the neighboring pixels,
comparing the difference with a value range or absolute depth values to determine a number of the plurality of three-dimensional points to be interpolated, and
interpolating the number of the plurality of three-dimensional points based on the values of the neighboring pixels; and
reprojecting the two-dimensional image to create volumetric content based, at least partially, on the plurality of interpolated three-dimensional points.

2. The method according to claim 1, wherein said value range is a range between a minimum depth value and a maximum depth value.

3. The method according to claim 1 further comprising:
using values from a texture image for the values of the neighboring pixels in the interpolation to obtain color values for the plurality of interpolated three-dimensional points.

4. The method according to claim 1 further comprising:
performing a texture image reconstruction during a geometry image reconstruction.

5. The method according to claim 1 further comprising:
obtaining a decoder interpolation parameter indicative of the value range or the absolute depth values for which one interpolation point should be generated with a decoder.

6. The method of claim 5 further comprising at least one of:
decoding the decoder interpolation parameter from a bitstream;
retrieving the decoder interpolation parameter from the decoder; or
receiving the decoder interpolation variable parameter as a user defined parameter.

7. The method of claim 1 further comprising:
performing the interpolation in at least one of x-direction or y-direction.

8. An apparatus comprising:
at least one processor,
non-transitory memory including computer program code,
the memory and the computer program code configured to, with the at least one processor, cause the apparatus to perform at least the following:
obtain a two-dimensional image containing visual information of three-dimensional objects;
obtain at least one patch of the two-dimensional image;
based on a determination that a plurality of three-dimensional points are projected to a same location on the at least one patch, interpolate the plurality of three-dimensional points for that location, wherein interpolating comprises the apparatus further configured to:
obtain a geometry information of the three-dimensional objects,
obtain neighboring pixels of the location based on said geometry information,
determine a difference of values of the neighboring pixels,
compare the difference with a value range or absolute depth values to determine a number of the plurality of three-dimensional points to be interpolated, and
interpolate the number of the plurality of three-dimensional points based on the values of the neighboring pixels; and
reproject the two-dimensional image to create volumetric content based, at least partially, on the plurality of interpolated three-dimensional points.

9. The apparatus according to claim 8, wherein said value range is a range between a minimum depth value and a maximum depth value.

10. The apparatus according to claim 8, wherein the apparatus is further caused to:
use values from a texture image for the values of the neighboring pixels in the interpolation to obtain color values for the plurality of interpolated three-dimensional points.

11. The apparatus according to claim 8, wherein the apparatus is further caused to:
perform a texture image reconstruction during a geometry image reconstruction.

12. The apparatus according to claim 8, wherein the apparatus is further caused to:
obtain a decoder interpolation parameter indicative of the value range or the absolute depth values for which one interpolation point should be generated with a decoder.

13. The apparatus of claim 12, wherein the apparatus is further caused to at least one of:
decode the decoder interpolation parameter from a bitstream;
retrieve the decoder interpolation parameter from the decoder; or
receive the decoder interpolation parameter as a user defined parameter.

14. The apparatus of claim 8, wherein the apparatus is further caused to:
perform the interpolation in at least one of x-direction or y-direction.

* * * * *